Patented Jan. 8, 1952

2,581,391

UNITED STATES PATENT OFFICE 2,581,391

CHLORO - OXYPROPYLATED DERIVATIVES OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application May 6, 1949, Serial No. 91,885

8 Claims. (Cl. 260—52)

The present invention is concerned with certain new chemical products, compounds, or compositions which have useful application in various arts. It includes methods or procedures for manufacturing said new chemical products, compounds, or compositions, as well as the products, compounds, or compositions themselves.

Said new compositions are chloro-oxypropylated derivatives of hydrophile hydroxylated synthetic products; said hydrophile synthetic products being oxyalkylated products of (A) An alpha-beta alkylene oxide having not more than 4 carbon atoms and selected from the class consisting of ethylene oxide, propylene oxide, butylene oxide, glycide, and methylglycide; and (B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

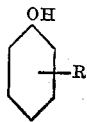

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; said chloro-oxypropylated compounds being obtained by reaction with epichlorohydrin.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial 91,884, filed May 6, 1949, now Patent 2,542,010, granted February 20, 1951. See also our co-pending application Serial No. 64,469, filed December 10, 1948.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants, etc.

The compounds or products herein described contain reactive labile chlorine atoms, and are particularly valuable as reactants to combine with tertiary amines, so as to yield quaternary ammonium compounds. See our co-pending application Serial No. 91,886, now Patent 2,542,011, granted February 20, 1951, and Serial No. 91,887, both filed May 6, 1949.

The oxyalkylated resins, used as intermediates to produce the products of this application are described in our Patent 2,499,370, granted March 7, 1950, and 2,542,010, granted February 20, 1951, and reference is made to these patents for a description of phenol-aldehyde resins used to produce the alcoholic products. For specific examples of these resins, reference is made to Examples 1a through 103a of Patent 2,499,370. For examples of oxyalkylated products derived from these resins, reference is made to the tables in columns 31 through 46 of Patent 2,542,010.

The reaction of epichlorohydrin is, in essence, a continuation of the reaction involving ethylene oxide, propylene oxide, or the like. The same equivalent can be used, but it is desirable to make a slight change in the matter of catalyst. The usual catalyst in the oxyalkylation of a material when neither reactant contains chlorine is an alkali such as has been pointed out previously. However, if either reactant contains chlorine another type of reactant can be employed advantageously, to wit, one of the metallic chlorides such as ferric chloride, tin chloride, etc. At times it is substantially necessary to use such a catalyst, for the reason that if an alkali is used, it reacts with a labile chlorine and the catalyst is lost. Our preferred procedure then is to add a slight amount of para-toluene sulfonic acid to the intermediate products so as to neutralize any residual alkalinity. We have then added small amounts of stannic chloride as a catalyst, so as to accelerate the reaction with epichlorohydrin. The amount used is less than one-half of 1%, based on the weight of the material, and usually one or two grams of stannic chloride are sufficient in a reaction involving 300 to 600 grams of reactants. Due to the higher boiling point of epichlorohydrin as compared with ethylene oxide, for example, one can use identically the same equipment as employed in the manufacture of resins, as described in Example 1a of Patent 2,499,370. In fact, it is our preference to use this particular equipment on a laboratory scale.

Example 1c

The equipment employed was specifically that described in Example 1a of Patent 2,499,370. The resin solution employed was that described as 105b of Patent 2,542,010. Note that in this instance, and in all subsequent examples, just sufficient para-toluene sulfonic acid was added in each case, if required to bring the product to substantially a neutral state, i. e., neutral or very faintly acid to methyl orange indicator. 554 grams of the oxyethylated resin solution were used, and to this there was added 1.6 grams of stannic chloride. The mixture was stirred and heated to 95° C. The above amount represented .8 of a mole per phenolic hydroxyl, based on the original phenol employed. The amount of epichlorohydrin added was just sufficient to react with all the phenolic hydroxyls, to wit, .8 of a mole, or 73.6 grams. The epichlorohydrin was added dropwise, with stirring, and all of it was added within a 20-minute period. There was no appreciable rise in temperature, and, in fact, the temperature had dropped to 88° C., after addition of the epichlorohydrin. The reaction was somewhat lighter in color. The reaction mix was then heated, with stirring, until a temperature of 130° C. was reached. At this point some of the liquid started to reflux at about 125° to 130° C., with a thermometer in the vapor reading 127° C. No reactant passed into the condenser. This indicated that the epichlorohydrin must have reacted completely at the end of this period, for the reason that it boils at 117° C. The yield was 520 grams which contained approximately 25% xylene. In all cases the treatment with epichlorohydrin does not seem to darken the appearance of the initial reactant, and, if anything, appears to make the color lighter. It seems to reduce the viscosity perhaps a trifle at the most, but definitely does reduce water-solubility. Our preference in all instances was to obtain materials, which, after treatment with epichlorohydrin, showed water-solubility at least equal to that described as desirable in connection with the oxyalkylated resin prior to treatment with epichlorohydrin. Stated another way, such material should meet the emulsification test, using xylene.

Example 2c

The same procedure was followed as in Example 1c, preceding, except that the oxyalkylated resin solution employed was that previously described under the heading 117b of Patent 2,542,010. The reactants employed were as follows: 645 grams of the resin solution; 55 grams of epichlorohydrin, and 1.2 grams of stannic chloride. The catalyst and the oxyalkylated resin solution were mixed together, as in Example 1c, and the epichlorohydrin added in a 10-minute period without any temperature rise. The temperature was then raised to 135° to 140° C. As the temperature moved upward there was a certain amount of refluxing which took place at 127° C. This reflux appeared for only a short period of time, and then the temperature rose rather rapidly to the predetermined point of 135° to 140° C. It was held at this temperature for one hour. At the end of this time, the reaction was complete. The final yield was approximately 700 grams containing about 20% xylene.

Example 3c

The same procedure was followed as in Example 1c, preceding, except that the resin solution employed was that described as 123b of Patent 2,542,010. The amount of this resin solution employed was 779 grams. The amount of catalyst employed was 1.2 grams. The amount of epichlorohydrin employed was 55.2 grams. The resin, plus the catalyst, was heated to about 110° C. and then the epichlorohydrin added in 15 minutes. The temperature remained at 110° to 115° C. for a short period of time, and then was raised to 140° C. and stirred for 30 minutes. The yield was about 850 grams, containing about 17% xylene.

The same procedure was followed in a number of similar products and the data for this series is tabulated in the table below:

| Ex. No.[1] | Oxyalk. Resin Sol. | Amt. in Grams | Epichlorohydrin Used Grams | SnCl₄ Grams | Max. React. Temp. ° C. | React. Period Hours | Yield Grams | Solv. Present Final Prod. Per Cent |
|---|---|---|---|---|---|---|---|---|
| 1c | 105b | 444 | 73.6 | 1.6 | 130 | 1 | 519 | 24.4 |
| 2c | 117b | 645 | 55.0 | 1.2 | 140 | 1 | 702 | 20.0 |
| 3c | 123b | 797 | 55.2 | 1.2 | 140 | ½ | 853 | 16.8 |
| 4c | 128b | 716 | 55.2 | 1.2 | 140 | 1 | 772 | 11.7 |
| 5c | 132b | 1135 | 230 | 2.0 | 140 | 1 | 1367 | 14.7 |
| 6c | 132b | 911 | 153 | 2.0 | 140 | 2½ | 1064 | 12.6 |
| 7c[2] | 132b | 532 | 153 | 2.0 | 130 | 4 | 600 | 15.0 |
| 8c | 132b | 554 | 370 | 2.0 | 130 | 7 | 887 | .6 |
| 9c | 136b | 1025 | 57.8 | 2.0 | 130 | 1 | 1085 | 15.8 |
| 10c[2] | 136b | 521 | 250 | 1.0 | 131 | 4 | 500 | 13 |
| 11c | 163b | 1149 | 129.5 | 3.0 | 135 | 1½ | 1282 | 17.3 |
| 12c[2] | 136b | 820 | 278 | 6.0 | 125 | 12 | 1073 | 12.8 |
| 13c | 140b | 710 | 92.5 | 2.0 | 135 | 1 | 804 | 22.2 |
| 14c | 140b | 710 | 46.2 | 2.0 | 130 | 1 | 758 | 23 |
| 15c[3] | 104a | 528 | 278 | 6.0 | 100 | 1½ | 1164 | 30 |

[1] Ex. No. of Patent 2,542,010.
[2] In these experiments apparently some of the epichlorohydrin was lost through the condenser. The amount which combined is definitely less than the initial amount, in view of the lower final yield.
[3] In this case an unoxyethylated resin was dissolved with enough added xylene to give a solution containing 40% xylene and 60% solvent. The ultimate product was diluted with enough additional xylene so that the final product contained 30% and 70% resin which had been treated with epichlorohydrin.

The chloro-oxypropylated compounds previously described have been prepared in presence of a slight amount of solvent, such as xylene. This xylene usually was residual from the preparation of the ester and carried through the oxyalkylation stage and into the final stage. We have found this purely as a matter of convenience, particularly since solvent may be present for subsequent use, i. e., demulsification, or for the preparation of more complex derivatives. Needless to say, the solvent can be removed. In other words, the solvent, such as xylene, can be distilled out and particularly employing a vacuum of about 20 to 40 mm. of mercury or thereabouts, and a temperature of 130° C.

Having thus described our invention, what we claim as new and desire to secure by Letters Patent is:

1. A chloro-oxypropylated derivative of hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methyglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

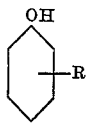

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; said chloro-oxypropylated compounds being obtained by reaction with epichlorohydrin.

2. A chloro-oxypropylated derivative of hydrophile hydroxylated synthetic products; said hydrophile synthetic products being oxyethylation products of an oxyethylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

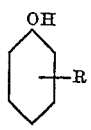

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(C_2H_4O)_n$, and $n$ is a numeral varying from 1 to 20; with the proviso that at least 2 moles of ethylene oxide be introduced for each phenolic nucleus; said chloro-oxypropylated compounds being obtained by reaction with epichlorohydrin; and with the further proviso that the hydrophile properties of the chloro-oxypropylated derivative, as well as the oxyethylated resin, in an equal weight of xylene are sufficient to produce an emulsion when said xylene solution is shaken vigorously with one to three volumes of water.

3. A chloro-oxypropylated derivative of hydrophile hydroxylated synthetic products; said hydrophile synthetic products being oxyethylation products of an oxyethylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

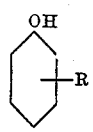

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(C_2H_4O)_n$, and $n$ is a numeral varying from 1 to 20; with the proviso that more than 4 moles of ethylene oxide be introduced for each phenolic nucleus; said chloro-oxypropylated compounds being obtained by reaction with epichlorohydrin; and with the further proviso that the hydrophile properties of the chloro-oxypropylated derivative, as well as the oxyethylated resin, in an equal weight of xylene are sufficient to produce an emulsion when said xylene solution is shaken vigorously with one to three volumes of water.

4. A chloro-oxypropylated derivative of hydrophile hydroxylated synthetic products; said hydrophile synthetic products being oxyethylation products of an oxyethylation-susceptible, fusible, organic solvent-soluble, water-insoluble, phenol-aldehyde resin; said resin being derived by reaction between a difunctional monohydric phenol and formaldehyde; said resin being formed in the substantial absence of phenols of functionality greater than 2; said phenol being of the formula:

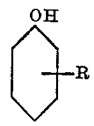

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(C_2H_4O)_n$; and $n$ is a numeral varying from 1 to 20; with the proviso that more than 4 moles of ethylene oxide be introduced for each phenolic nucleus; said chloro-oxypropylated compounds being obtained by reaction with epichlorohydrin on the equimolar basis of one mole of the epoxy compound for each phenolic hydroxyl originally present; and with the further proviso that the hydrophile properties of the chloro-oxypropylated derivative, as well as the oxyethylated resin, in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | De Groote | Apr. 13, 1937 |
| 2,499,365 | De Groote | Mar. 7, 1950 |

FOREIGN PATENTS

| Number | Country | Date |
|---|---|---|
| 576,177 | Germany | May 8, 1933 |